Figure 1:
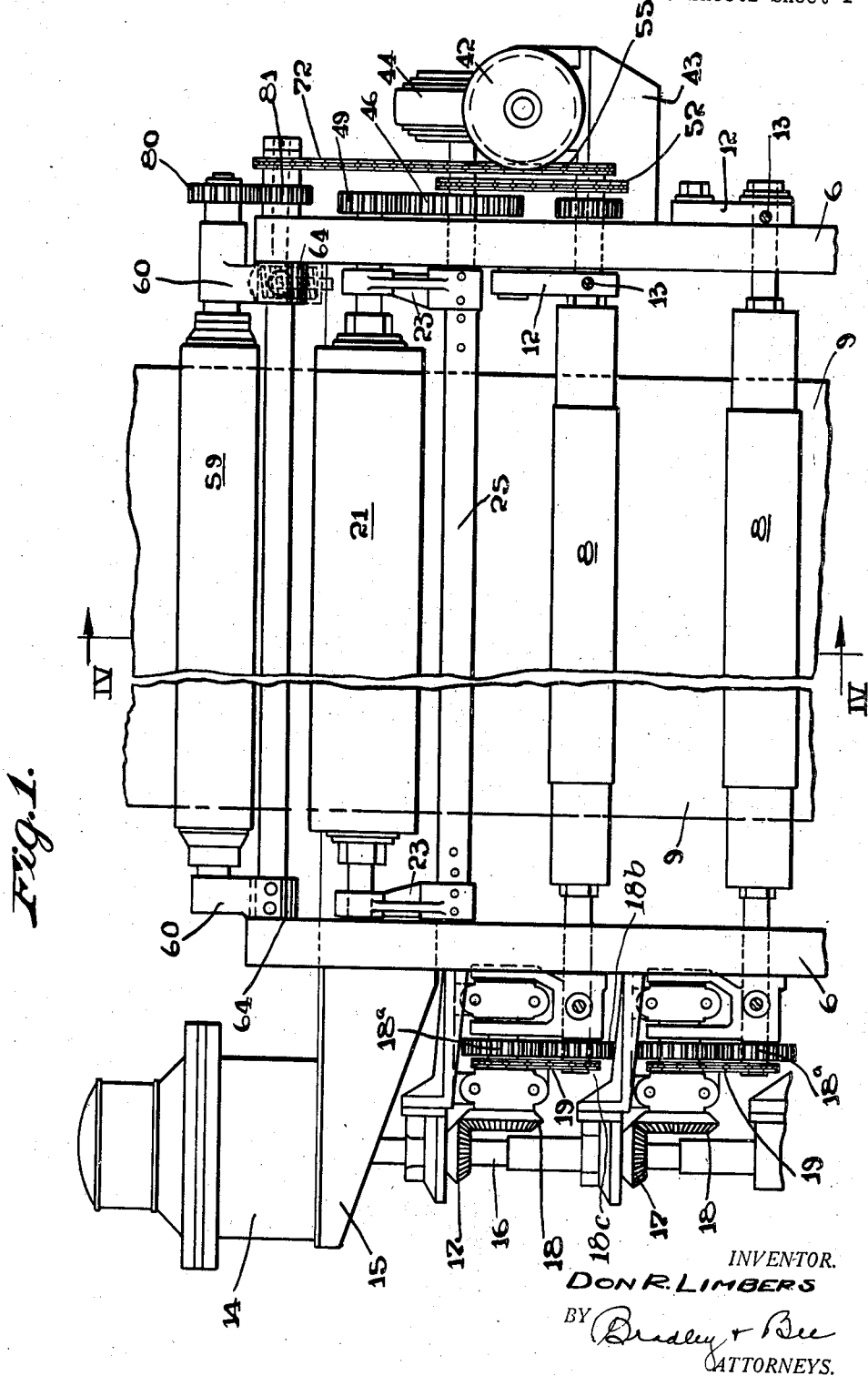

Dec. 26, 1939.  D. R. LIMBERS  2,184,873
MACHINE FOR DRAWING WINDOW GLASS
Filed April 16, 1936   5 Sheets-Sheet 4
Fig. 4.
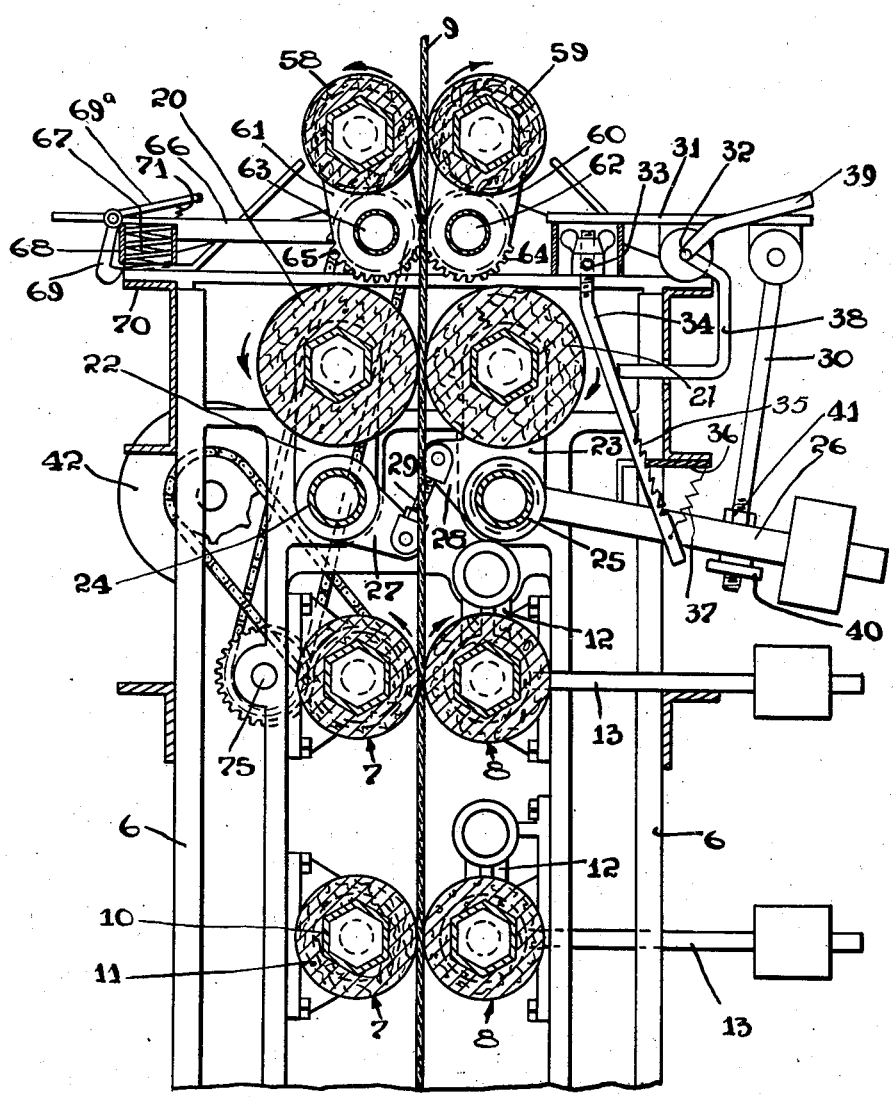
INVENTOR.
DON R. LIMBERS
BY 
ATTORNEYS.

Dec. 26, 1939.  D. R. LIMBERS  2,184,873
MACHINE FOR DRAWING WINDOW GLASS
Filed April 16, 1936   5 Sheets—Sheet 5

INVENTOR.
DON R. LIMBERS
BY Bradley & Bee
ATTORNEYS.

Patented Dec. 26, 1939

2,184,873

UNITED STATES PATENT OFFICE 2,184,873

MACHINE FOR DRAWING WINDOW GLASS

Don R. Limbers, Clarksburg, W. Va., assignor to Pittsburgh Plate Glass Company, Allegheny County, Pa., a corporation of Pennsylvania Application April 16, 1936, Serial No. 74,677

7 Claims. (Cl. 49—17)

Figure 2:
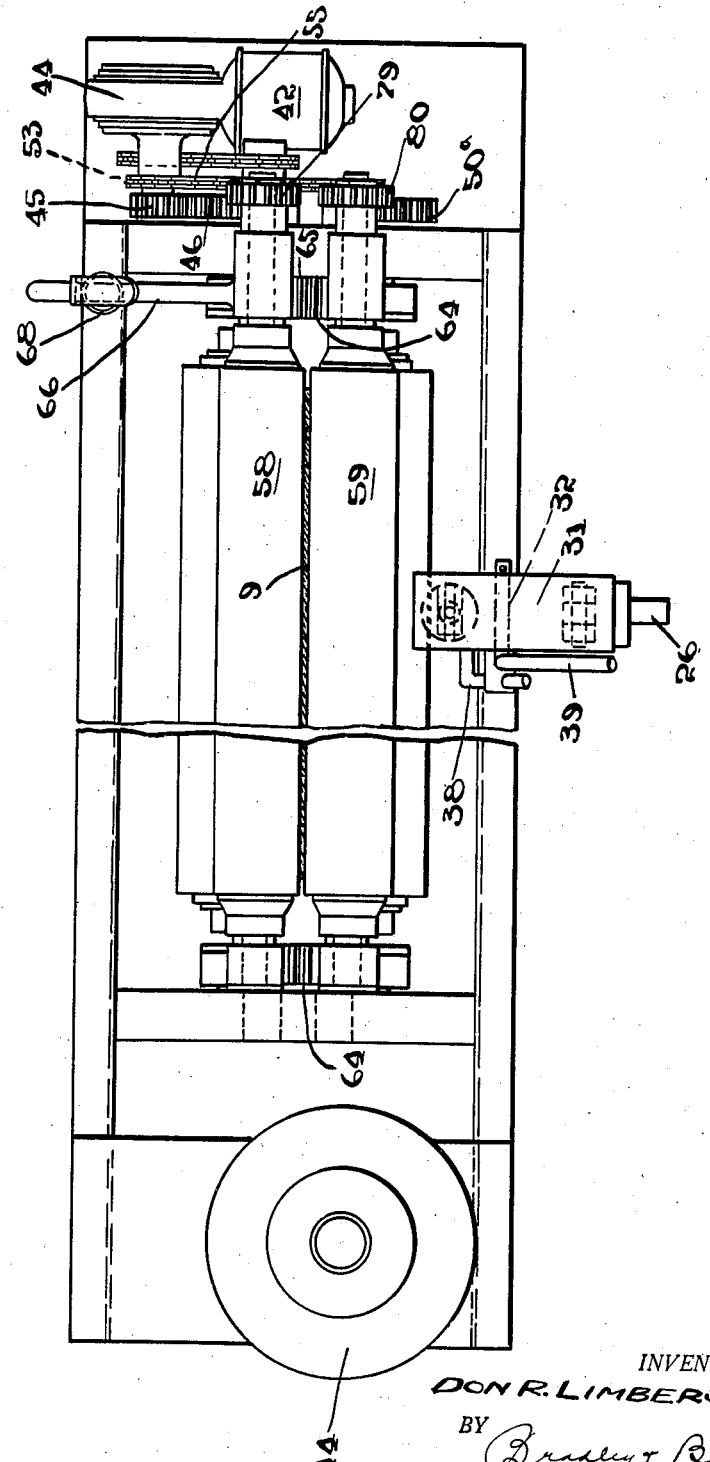
Figure 3:
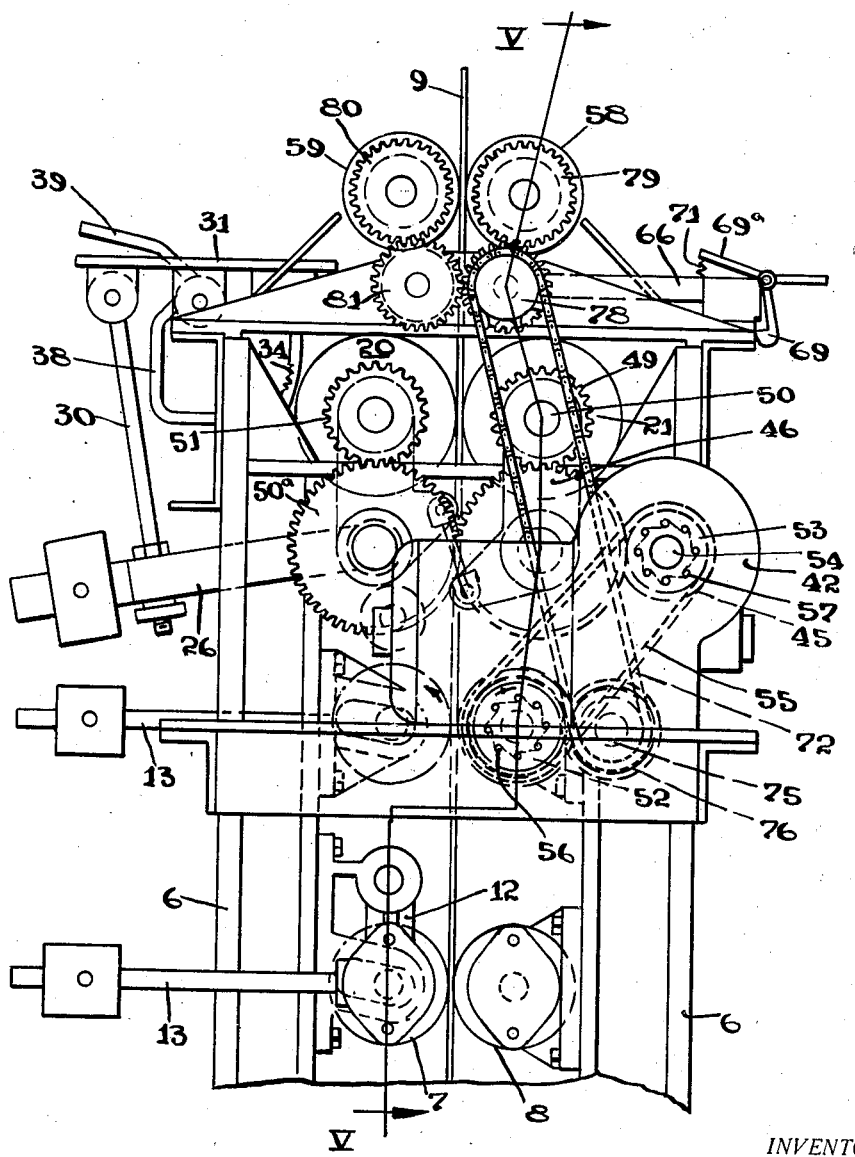
Figure 5:
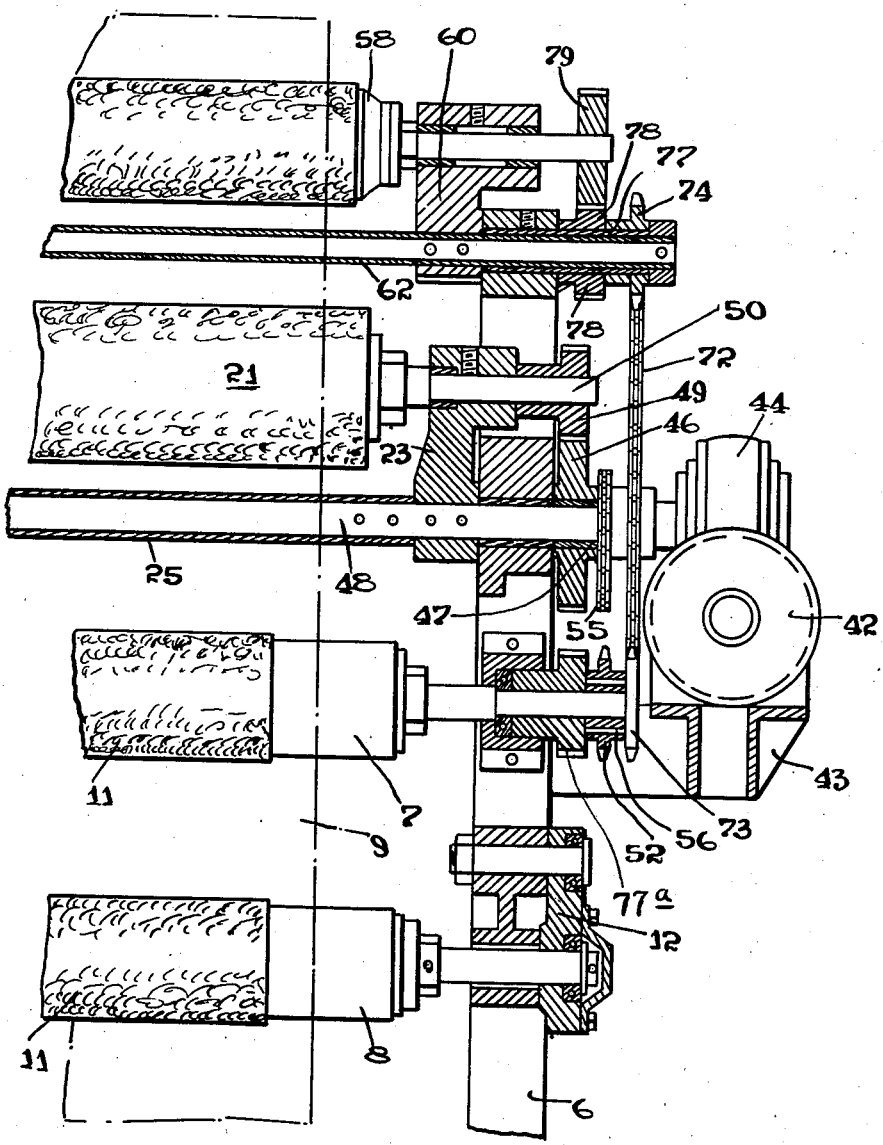

The invention relates to a machine for making window glass, and is designed for use in connection with a leer of the Fourcault or Slingluff type, in which a glass sheet is drawn upward continuously from a body of molten glass passing through the leer and being cut into sections thereabove. In such an operation, the surface of the glass sheet is marked due to its passage through the drawing rolls which are of asbestos composition and leave marks on the glass incident to the crumbling of the asbestos composition. One of the objects of the invention is to provide improved means in the leer casing above the drawing rolls to remove the roll marks. A further object is the provision of improved means of the character specified which will prevent splinters of glass which are incident to the cutting operation or small pieces of glass due to breakage from working their way downward between the drawing rolls and the glass sheet and producing scratches and causing breakage. A still further object is the provision of improved means of the character specified which will assist in the drawing operation and which will involve no hazard to the workmen above the leer during the performance of their duties of cutting the glass into sections and removing broken pieces of glass which are carried through the leer. One embodiment of the invention is illustrated in the accompanying drawings, wherein:

Figure 1 is a front elevation of the upper portion of a leer casing embodying the invention. Fig. 2 is a plan view. Fig. 3 is a side elevation. Fig. 4 is a vertical section on the line IV—IV of Fig. 1. And Fig. 5 is a vertical section on the line V—V of Fig. 3.

Referring to the drawings, 6, 6 are the side members of the leer frame, in which is mounted a series of pairs of rolls 7, 8 for drawing the glass sheet 9 upward from a body of molten glass. These sets of rolls are arranged in series throughout the length of the leer and are of similar construction comprising metal tubes 10 (Fig. 4) on which are mounted coverings 11 of asbestos composition, such composition being relatively hard and dense as is well known in the art. The rolls 7, 7, etc. lying on one side of the glass sheet are mounted in fixed bearings, while the rolls 8, 8, etc. on the other side of the glass sheet are mounted for movement on hangers 12, 12, etc., and are yieldingly pressed toward the opposing rolls by means of the counterweighted levers 13, 13, etc., this also being a construction well known in the art. The rolls are driven at their left hand ends (Fig. 1) from a motor 14 mounted upon the bracket 15 secured to the frame and having a sectional vertical drive shaft 16 which extends the length of the leer. This shaft carries a series of bevel gears 17 meshing with the bevel gears 18 and driving the rolls through the intermediary of the gears 18a and the chains 19. The gears 18 and 18a are keyed on a short countershaft, and the gear 18a meshes with a gear 18b on the end of the shaft of the roll 8. The roll which opposes the roll 8 on the other side of the glass sheet is driven by the chain 19 which passes around a sprocket keyed on the countershaft and around a sprocket attached to the end of the shaft of the roll which opposes the roll 8.

Located above the top pair of leer rolls is a pair of buffing rolls 20 and 21. These rolls comprise tubular shafts covered with suitable buffing material, such as cloth or wool. In normal operation, they are driven in the same direction as the leer rolls, but at a much higher speed and they function to clean the glass surfaces from any marks incident to the passage of the glass sheet through the leer rolls. They also prevent any small splinters of glass from working down along the sides of the sheet into the spaces between the faces of the sheet and the leer rolls, such particles of glass tending to scratch the sheet and cause breakage. Since the rolls engage the glass with considerable pressure, they also function to assist in drawing the sheet, and as later described, are arranged to be driven at times at the same peripheral speed as the leer rolls, thus serving as drawing rolls under such conditions. These rolls are mounted for movement toward and from each other on pairs of arms 22, 23, which are keyed to the transverse shafts 24, 25 mounted in the leer frame. The shaft 25 has secured thereto a counterweighted arm 26 (Fig. 4) which tends to swing the roll 21 away from the glass sheet. In order to secure a similar movement in the roll 20 by the operation of the counterweight, the shafts 24 and 25 are provided with crank arms 27 and 28 coupled together by the threaded rod 29, so that when the shaft 25 is rotated in a clockwise direction by the counterweight, the shaft 24 is rotated in a counterclockwise direction, thus moving the roll 20 to the left, as the roll 21 moves to the right.

In order to hold the buffing rolls in engagement with the glass sheet, the connecting rod 30 is employed secured at its lower end to the arm 26 and at its upper end to a plate or shoe 31 pivoted at 32 on the top of the leer frame. The left hand end of the shoe has pivoted thereto a lug 33, which carries the latch 34, whose lower end is toothed, as indicated at 35, and is pulled into engagement with a detent 36 by means of a spring 37. The latch 34 thus maintains the parts in the position shown until released by movement to the left (Fig. 4), which permits the counterweighted arm 26 to move down. The latch 34 is adapted to be released by means of the arm 38 also pivoted at 32 and provided with a handle 39 which is adapted to be moved by the foot of the operator who works upon a floor located substantially at this level. In order to adjust the pressure of the buffing rolls upon the glass sheet and to adapt them to sheets of different thickness, the rod 30 is provided with an adjusting nut 40, the parts being locked in adjusted position by means of the nut 41.

The buffing rolls are driven independently of the operation of the leer rolls by means of a motor 42 (Fig. 1) carried upon a bracket 43 projecting from the side of the leer frame. This motor operates through reduction gearing in the casing 44 to drive a gear 45 (Fig. 2) meshing with a gear 46 mounted on the sleeve 47 (Fig. 5). This sleeve is journalled on the end of a short shaft section 48 which constitutes a continuation of the hollow shaft 25. The gear 46 meshes with a spur gear 49 carried by the shaft section 50 (Fig. 5) which constitutes an extension of the hollow shaft of the roll 21. The hollow shaft 24 also has at its end a sleeve similar to the sleeve 47, on which is mounted the gear 50a (Fig. 3) meshing with the gear 46 and having driving engagement with the gear 51 carried at the end of the shaft of the roll 20.

Provision is also made for driving the buffer rolls from the leer roll drive when the motor 42 is not operating. Such drive comprises a chain sprocket 52 on the end of the shaft of the roll 7 and a similar sprocket 53 mounted on the shaft 54 which carries the gear 45, the chain 55 passing around such sprockets. The chain sprockets 52 and 53 are provided with runover clutches 56 and 57, as indicated in Fig. 3, which permit the motor 42 to operate without any tendency to drive the shaft of the roll, and also permits the drive of the sprocket 53 from the shaft of the roll 7 without any tendency to drive the motor 42 through the reduction gearing in the casing 44. It is thus possible to drive the buffer rolls 20 and 21 at a high speed from the motor 42 or under certain conditions, to drive such rolls at the same peripheral speed as the leer rolls 7, 8 when current is cut off from the motor 42.

Mounted above the buffer rolls 20 and 21 is a pair of rolls 58 and 59 (Fig. 4) similar in construction to the buffer rolls, but smaller in diameter. These rolls are normally driven at the same peripheral speed as the leer rolls 7, 8, and since they are pressed against the glass sheet, assist in drawing it upwards. They also act as steady means to prevent vibration of the sheet during the cutting operation, which occurs immediately above these rolls. Their primary function, however, is to add to the safety of the apparatus and they are, therefore, commonly referred to as "guard rolls" or "safety rolls". They act as a shield and intercept any small chips or pieces of broken glass which may be thrown upward by the high speed buffer rolls 20 and 21 during the buffing operation. Without this protection, the workmen operating above the leer and engaged in cutting off the glass sheets and removing them might be injured by the flying pieces of glass. These rolls perform the still further function of intercepting the downward movement of small pieces of glass and chips incident to the cutting operation, thus supplementing the similar function performed by the buffing rolls as heretofore commented upon. These rolls are mounted upon hangers in the form of pairs of arms 60 and 61 carried upon and keyed to the hollow shafts 62 and 63. The hubs of the hangers are provided with segmental gears 64 and 65 (Figs. 1 and 4) meshing together, so that when the shaft 63 is rotated, in a counterclockwise direction (Fig. 4) to swing the roll 58 away from the glass, a similar movement is given to the roll 59, thus removing both rolls from contact with the glass. The hub of the hanger 61 has integral therewith an operating lever 66 (Fig. 4) normally pressed upward by a spring 67 in the casing 68, so that normally the rolls 58 and 59 are caused to engage the glass sheet yieldingly. The end of the lever is provided with a latch 69 having a handle 69a and adapted to engage beneath the abutment 70 when the lever 66 is pushed downward, the movement of the latch to engaging position being occasioned by the spring 71. This arrangement makes possible the operation of the lever and the latch by the foot of the workman on the floor, which is at about the level of the top of the leer.

The rolls are moved to open position when it becomes necessary to remove sections of the glass sheet which may have become broken before emerging from the leer. The safety rolls are driven from the drive of the leer by means of a chain 72 passing around sprockets 73 and 74 (Fig. 5). The sprocket 73 is carried by a stub shaft 75, which also has keyed to it a gear 76 and this gear 76 meshes with a gear 77a carried upon the shaft of the roll 7 which also carries the sprocket 52 (Fig. 5). The sprocket 74 is keyed to a sleeve 77 mounted for rotation on the end of the hollow shaft 62. The sleeve 77 has keyed thereto a pinion 78 meshing with a pinion 79 carried by the shaft of the roll 58. The shaft of the other roll 59 is provided with a gear 80 meshing with a pinion 81 on a sleeve at the end of the shaft 63 corresponding to the sleeve 77, and such gear meshes with the gear 78, thus providing for a similar drive for the safety rolls 58 and 59. It will be observed that the control mechanism governing the movement of the rolls 20 and 21, and 58 and 59 is located below the level of the rolls 58 and 59, in such position that they are operable by the feet of the workmen engaged in cutting off and removing the glass sheets at the upper end of the leer, the plate 31 with its latch 39 and the lever 66 and its latch 69 being operable in this way.

In the normal operation of the machine, the two sets of rolls 20 and 21, and 58 and 59 yieldingly engage the glass sheet with the buffing rolls 20 and 21 operating at a high rate of speed in order to clean the glass properly, and the rolls 58 and 59 operating at a low speed. In case any breakage occurs longitudinally of the sheet calling for the removal of sections of glass separate from the main body thereof, the separation of the rolls often becomes desirable and this may be easily and quickly accomplished by the control means above described. At other times, it may be desirable to use the buffing rolls merely as supplemental drawing means, and in this case, the operation of the motor 42 is discontinued and the drive of the rolls is taken up through the sprocket chain 55 and the gearing with which it cooperates as heretofore described.

What I claim is:

1. In combination with a vertical leer casing provided with a plurality of pairs of driven rolls for drawing a glass sheet continuously upward therethrough, a pair of buffing rolls of yielding material at the upper end of the casing, means for driving the buffing rolls in the same direction as the drawing rolls and at a substantially higher speed to secure a buffing action on the surface of the sheet as it passes the buffing rolls, a pair of guard rolls of yielding material above the buffing rolls adapted to engage the opposite faces of the glass sheet, and means to rotate the guard rolls in the same direction as the buffing rolls but at a lower speed than the buffing rolls.

2. In combination with a vertical leer casing provided with a plurality of pairs of driven rolls for drawing a glass sheet continuously upward therethrough, a pair of buffing rolls of yielding material at the upper end of the casing, means for driving the buffing rolls in the same direction as the drawing rolls and at a substantially higher speed to secure a buffing action on the surface of the sheet as it passes the buffing rolls, a pair of guard rolls of yielding material above the buffing rolls and adapted to engage the opposite faces of the glass sheet, and means for drawing the guard rolls in the same direction and at substantially the same speed as the drawing rolls.

3. In combination with a vertical leer casing provided with a plurality of pairs of driven rolls for drawing a glass sheet continuously upward therethrough, a pair of buffing rolls of yielding material at the upper end of the casing, means for driving the buffing rolls in the same direction as the drawing rolls, and at a substantially higher speed to secure a buffing action on the surface of the sheet as it passes the buffing rolls, and guard means of yielding material located above the buffing means adapted to engage the opposite faces of the glass sheet.

4. In combination with a vertical leer casing provided with a plurality of pairs of driven rolls for drawing a glass sheet continuously upward therethrough, a pair of buffing rolls of yielding material at the upper end of the casing mounted for movement toward and from each other, means for adjusting the buffing rolls toward each other to regulate their pressure on the glass sheet, readily releasable means for holding the buffing rolls in their positions of adjustment, and self acting means for moving the buffing rolls apart when said last means are released.

5. In combination with a vertical leer casing provided with a plurality of pairs of driven rolls for drawing a glass sheet continuously upward therethrough, a pair of buffing rolls of yielding material at the upper end of the casing mounted for movement toward and from each other, means for adjusting the buffing rolls toward each other to regulate their pressure on the glass sheet, latching means in position to be operated by the foot of the operator working above the leer casing for holding the buffing rolls in their positions of adjustment, and self acting means for moving said buffing rolls apart when the latching means are released.

6. In combination with a vertical leer casing provided with a plurality of pairs of driven rolls for drawing a glass sheet continuously upward therethrough, a pair of buffing rolls of yielding material at the upper end of the casing, means for driving the rolls in the same direction as the drawing rolls and at a substantially higher speed to secure a buffing action on the surface of the sheet as it passes the buffing rolls, a pair of guard rolls of yielding material above the buffing rolls mounted for movement toward and from each other, yielding means for moving the guard rolls toward each other to engage the glass sheet, and a latch for holding said last means against movement.

7. In combination with a vertical leer casing provided with a plurality of pairs of driven rolls for drawing a glass sheet continuously upward therethrough, a pair of buffing rolls of yielding material at the upper end of the casing mounted for movement toward and from each other, adjustable means in position to be operated by the foot of the operator working above the leer casing for moving the buffing rolls toward each other into engagement with the glass sheet, a latch also in position to be operated by the foot of the operator for holding the buffing rolls in engagement with the glass sheet, and self-acting means for moving the buffing rolls apart when the latch is released.

DON R. LIMBERS.